United States Patent
Wu et al.

(10) Patent No.: US 12,498,773 B2
(45) Date of Patent: Dec. 16, 2025

(54) AIR BAFFLE FIXING STRUCTURE AND AIR GUIDING DEVICE

(71) Applicant: Wistron NeWeb Corporation, Hsinchu (TW)

(72) Inventors: Yu-Shuo Wu, Hsinchu (TW); Tzu-Mao Feng, Hsinchu (TW); Pei-Min Hsu, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 203 days.

(21) Appl. No.: 18/403,841

(22) Filed: Jan. 4, 2024

(65) Prior Publication Data
US 2024/0231446 A1 Jul. 11, 2024

(30) Foreign Application Priority Data
Jan. 5, 2023 (TW) ................. 112100397

(51) Int. Cl.
*G06F 1/20* (2006.01)
*H05K 7/20* (2006.01)

(52) U.S. Cl.
CPC ........... *G06F 1/20* (2013.01); *H05K 7/20145* (2013.01)

(58) Field of Classification Search
CPC ...... B42F 1/08; Y10T 24/20; Y10T 24/44778; Y10T 24/44786; A44C 5/0084; F16L 33/03; F16L 33/04; F16L 33/06; G06F 1/20; H05K 3/325; H05K 3/365; H05K 7/20145; H05K 1/0281
See application file for complete search history.

(56) References Cited

U.S. PATENT DOCUMENTS

| | | | | |
|---|---|---|---|---|
| 1,985,866 A * | 12/1934 | Lankenau | ................ | B42F 1/08 24/546 |
| 5,393,184 A * | 2/1995 | Beeuwkes, III | ......... | H02G 3/26 411/480 |
| 5,406,680 A * | 4/1995 | Silverberg | ............... | B42F 1/08 24/546 |
| 5,549,479 A * | 8/1996 | Elco | ...................... | H01R 12/88 439/267 |
| 11,696,421 B1 * | 7/2023 | Ganti | ..................... | F04B 39/06 165/80.2 |
| 2004/0064920 A1 * | 4/2004 | Arduini | .................... | B42F 1/08 24/67.9 |
| 2004/0172791 A1 * | 9/2004 | Arduini | .................... | B42F 1/08 24/67.9 |

(Continued)

*Primary Examiner* — Michael A Matey
(74) *Attorney, Agent, or Firm* — McClure, Qualey & Rodack, LLP

(57) ABSTRACT

An air baffle fixing structure is configured to be disposed on a board for fixing an air baffle. The air baffle fixing structure includes at least one fixing part, at least one supporting part and at least two ring parts. The fixing part, the supporting part and the ring parts are integrally formed by a metal wire. The fixing part is used for being connected to the board. The supporting part is connected to the fixing part along a standing direction. At least one of the ring parts is connected to the supporting part. The ring parts overlap in a clamping direction and a clamping gap is formed between the ring parts. The clamping gap is used for fixing the air baffle along an air direction, and the air direction is perpendicular to the clamping direction.

20 Claims, 16 Drawing Sheets

(56) References Cited

U.S. PATENT DOCUMENTS

| | | | | |
|---|---|---|---|---|
| 2012/0046692 A1* | 2/2012 | Smith | ................ | A61B 17/064 |
| | | | | 606/219 |
| 2013/0186134 A1* | 7/2013 | Goldstein | ............ | A44C 9/0023 |
| | | | | 63/3.1 |
| 2020/0347972 A1* | 11/2020 | Seimears | ................ | F16L 33/04 |

\* cited by examiner

AIR BAFFLE FIXING STRUCTURE AND AIR GUIDING DEVICE

CROSS-REFERENCE TO RELATED PATENT APPLICATION

This application claims the benefit of priority to Taiwan Patent Application No. 112100397, filed on Jan. 5, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

BACKGROUND

Technical Field

The present disclosure relates to an air baffle fixing structure and an air guiding device, in particular to an air baffle fixing structure and an air guiding device that can reduce production costs, improve production efficiency, and increase space for wiring.

Description of Related Art

Many switches or servers with high power often use fans as a heat dissipation method. Fans are usually equipped with air guiding plates to control the airflow direction and heat dissipation direction, allowing the airflow to pass through positions of the main heat-dissipating components. Generally, when disposing of an air guiding plate, a leg is bent at the bottom of the air guiding plate, and the bottom of the leg is attached with back adhesive. The back adhesive is then attached to a metal plate or a circuit board.

However, the above fixing methods incur high costs both at the supplier end and the assembly end. For example, in addition to the requirement of using a cutting die to cut and press the body of the air guiding plate, it also requires the workforce to stick the back adhesive and press to fix it. In addition, the metal plate or circuit board must fit the legs of the air guiding plate and be reserved with adhesive areas, which not only occupies a lot of space but also affects the overall wiring configuration.

In response to the above-referenced technical inadequacies, how to improve the problems as mentioned has become an issue worthy of study by relevant industries.

SUMMARY

In order to solve the above-mentioned problems, one of the technical aspects adopted by the present disclosure is to provide an air baffle fixing structure configured to be disposed on a board and for fixing an air baffle. The air baffle fixing structure includes at least one fixing part, at least one supporting part, and at least two ring parts. The fixing part is for connecting to the board. The supporting part is connected to the fixing part along a standing direction. The supporting part is connected to one of the ring part. The two ring parts are overlapped in a clamping direction. A clamping gap is formed between the two ring parts. The clamping gap is configured to fix the air baffle along an air direction, and the air direction is perpendicular to the clamping direction. The fixing part, the supporting part, and the ring parts are integrally formed by bending a metal wire.

In order to solve the above-mentioned problems, another one of the technical aspects adopted by the present disclosure is to provide an air guiding device including a board, an air baffle, and an air baffle fixing structure. One end of the air baffle fixing structure is connected to the board. Another end of the air baffle fixing structure is connected to the air baffle. The air baffle fixing structure is configured to fix the air baffle on the board. The air baffle fixing structure includes at least one fixing part, at least one supporting part and at least two ring parts. The fixing part is connected to the board. The supporting part is connected to the fixing part, and the supporting part is erected from the board in a direction away from the board. The supporting part is connected to at least one of the ring parts. The two ring parts are overlapped in a clamping direction. A clamping gap is formed between the two ring parts. The air baffle is fixed in the clamping gap along an air direction, and the air direction is perpendicular to the clamping direction. The fixing part, the supporting part, and the ring parts are integrally formed by bending a metal wire.

BRIEF DESCRIPTION OF THE DRAWINGS

The described embodiments may be better understood by reference to the following description and the accompanying drawings, in which.

DETAILED DESCRIPTION

Figure 1:
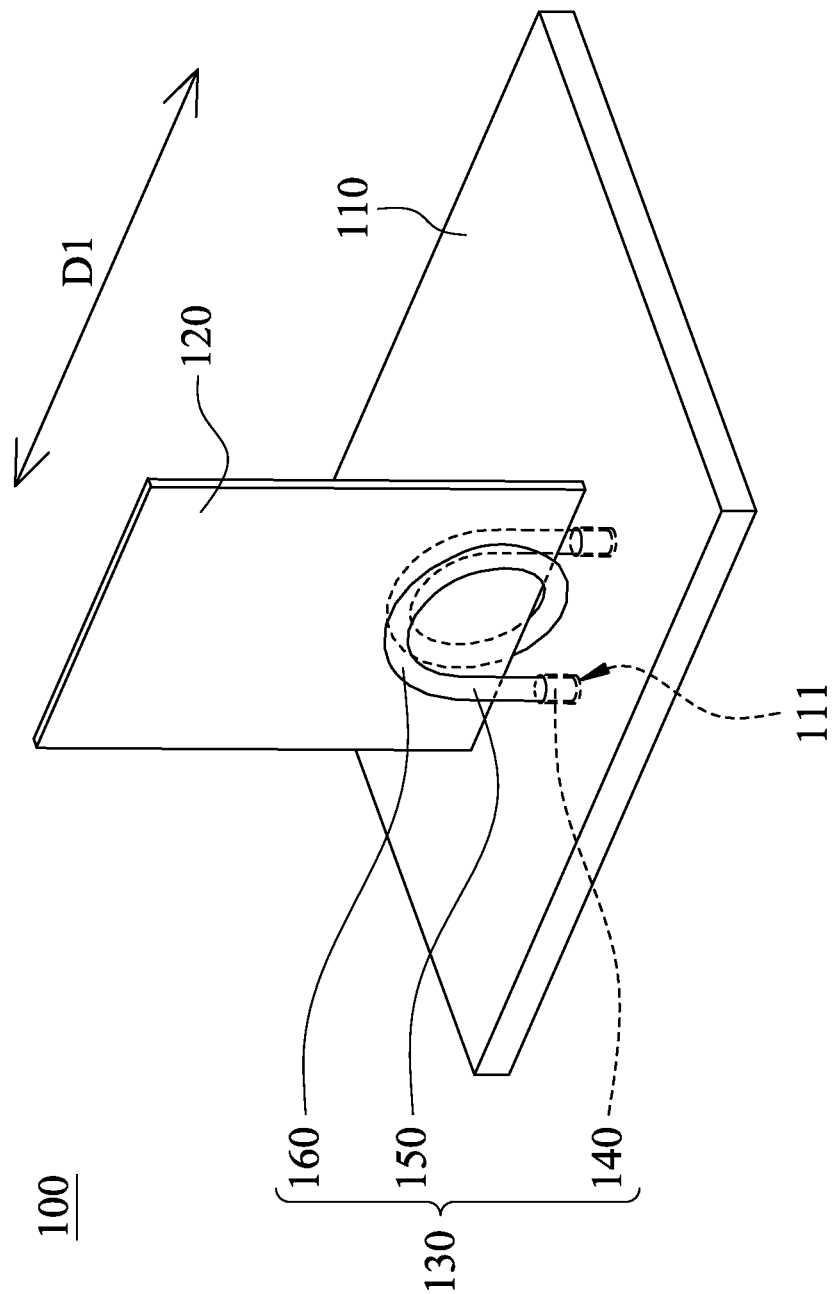
FIG. 1 is a schematic view of an air guiding device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 3:
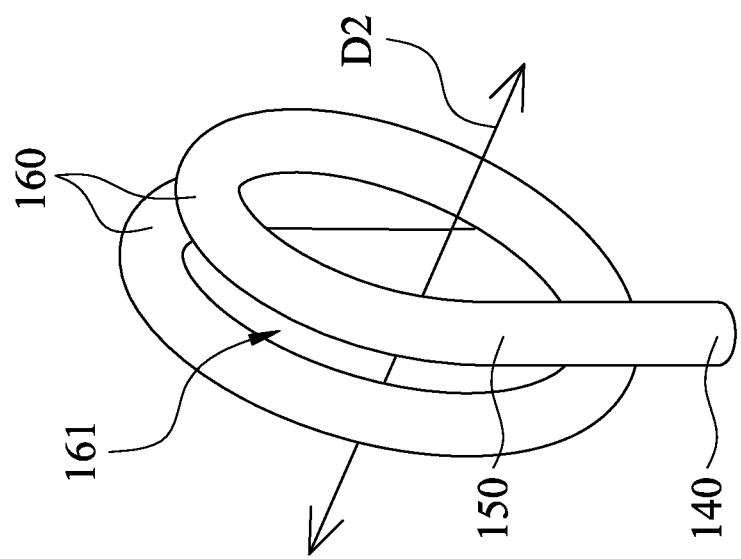
FIG. 3 is another schematic view of the air baffle fixing structure of the air guiding device according to the first embodiment of FIG. 1.
Figure 2:
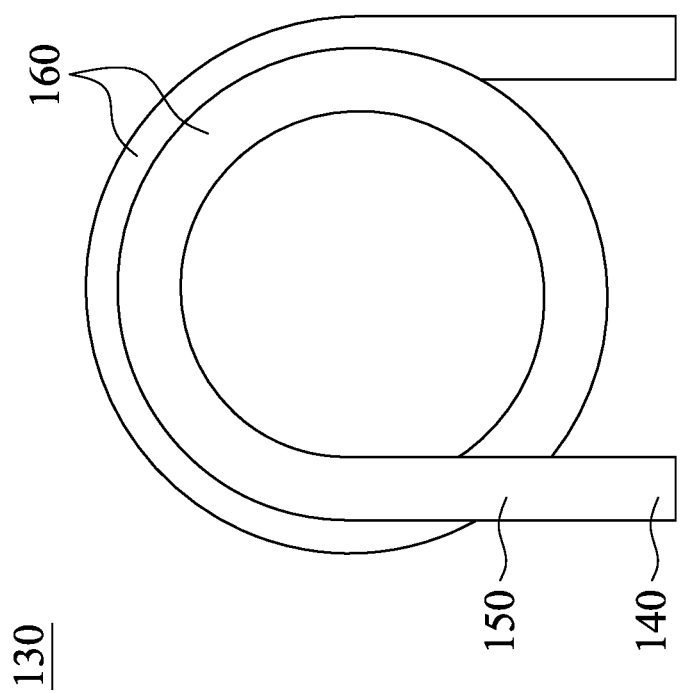
FIG. 2 is a schematic view of an air baffle fixing structure of the air guiding device according to the first embodiment of FIG. 1.

Please refer to FIG. 1, FIG. 2, and FIG. 3. FIG. 1 is a schematic view of an air guiding device 100 according to a first embodiment of the present disclosure. FIG. 2 is a schematic view of an air baffle fixing structure 130 of the air guiding device 100 according to the first embodiment of FIG. 1. FIG. 3 is another schematic view of the air baffle fixing structure 130 of the air guiding device 100 according to the first embodiment of FIG. 1.

As shown in FIG. 1, the air guiding device 100 includes a board 110, an air baffle 120, and an air baffle fixing structure 130. One end of the air baffle fixing structure 130 is connected to the board 110, and another end of the air baffle fixing structure 130 is connected to the air baffle 120. The air baffle fixing structure 130 is configured to fix the air baffle 120 on the board 110. Specifically, the board 110 may be a metal plate of a circuit board or a housing, but not limited thereto. In this way, through the air baffle fixing structure 130, the air baffle 120 is fixed and erected on the board 110 to achieve an effect of controlling the direction of air, which allows the air to flow through positions of the components needed to be cooled.

As shown in FIG. 2 and FIG. 3, the air baffle fixing structure 130 includes at least one fixing part 140, at least one supporting part 150, and at least two ring parts 160. The fixing part 140 is configured to be connected to the board 110, and the supporting part 150 is connected to the fixing part 140. Specifically, in the first embodiment, the supporting part 150 is connected to the fixing part 140 along a standing direction. The standing direction is on the same axis as the fixing part 140, so that the supporting part 150 is erected in a direction away from the board 110.

The supporting part 150 is connected to at least one ring part 160 in which the two ring parts 160 are overlapped in a clamping direction D2, and a clamping gap 161 is formed between the two ring parts 160. The clamping gap 161 is configured to fix the air baffle 120 along an air direction D1 in which the air direction D1 is perpendicular to the clamping direction D2.

By the above configuration, the air baffle fixing structure 130 of the present disclosure fixes the air baffle 120 through the clamping gap 161 between the ring parts 160. Compared with conventional fixing methods, which use back adhesive to stick a circuit board or a metal plate, the air baffle fixing structure 130 of the present disclosure can reduce space occupied on the board 110, which allows the board 110 to obtain more space for wiring.

In addition, as shown in FIG. 2 and FIG. 3, the fixing part 140, the supporting part 150, and the ring parts 160 are integrally formed by bending a metal wire. In this way, compared with conventional fixing methods using back adhesive to stick a circuit board or a metal plate, the above embodiment can effectively reduce the cost of mold making and assembly. Moreover, the metal wire can be directly welded to the board 110 by using a plating material. Accordingly, the air baffle fixing structure 130 of the present disclosure can be applied to automated production processes, such as Dual In Line Package (DIP) process and Surface Mount Technology (SMT), to effectively enhance the overall production efficiency and product competitiveness of the air guiding device 100 of the present disclosure.

A width of the clamping gap 161 may be smaller than a thickness of the air baffle 120 in the clamping direction D2. Said thickness of the air baffle 120 refers to its thickness in the clamping direction D2. By inherent elastic physical characteristics of the metal wire, a clamping gap 161 with a smaller width is set to enable the air baffle 120 to be firmly clamped in the clamping gap 161. Specifically, the air baffle 120 may be a plastic sheet material with a thickness ranging from 0.25 mm to 2.0 mm, or a metal sheet material with a thickness ranging from 0.15 mm to 0.4 mm.

The air baffle 120 has a clamping height and a total height, where the clamping height refers to the height at which the air baffle 120 is clamped in the clamping gap 161 in a direction perpendicular to the board 110. Said total height refers to a height of the air baffle 120 in a direction perpendicular to the board 110. Said ratio of the clamping height to the total height can be between 0.25:1 and 1:1, so as to ensure that the ring parts 160 stably clamp the air baffle 120.

A diameter of the metal wire can range from 0.5 mm to 2.0 mm. Therefore, the air baffle fixing structure 130 can provide stable supporting force and clamping force, thereby improving the overall structural stability of the air guiding device 100.

Specifically, in the first embodiment, the number of the fixing parts 140, the support parts 150, and the ring parts 160 are two, respectively. The number of the ring parts 160 can be determined according to needs and is not limited to the disclosure. Specifically, as shown in FIG. 2 and FIG. 3, each of the supporting parts 150 is connected between each of the fixing parts 140 and each of the ring parts 160. In this way, through the configuration of fixing parts 140 and the supporting parts 150 as described above, the effect of the air baffle 120 supported by the air baffle fixing structure 130 can be more balanced.

In addition, as shown in FIG. 1, in the first embodiment, the board 110 includes fixing holes 111, and the fixing parts 140 of the air baffle fixing structure 130 are inserted through the fixing holes 111. Therefore, the fixing parts 140 can be disposed on the board 110 using the DIP process, so as to achieve automated assembly. Moreover, through the connection relation between the fixing parts 140 of the air baffle fixing structure 130 and the fixing holes 111 of the board 110, not only can the air baffle fixing structure 130 be securely connected to the board 110, but also the occupied area of the air baffle fixing structure 130 on the board 110 can be reduced. As a result, the air guiding device 100 can have more space for wiring.

Second Embodiment

Figure 4:
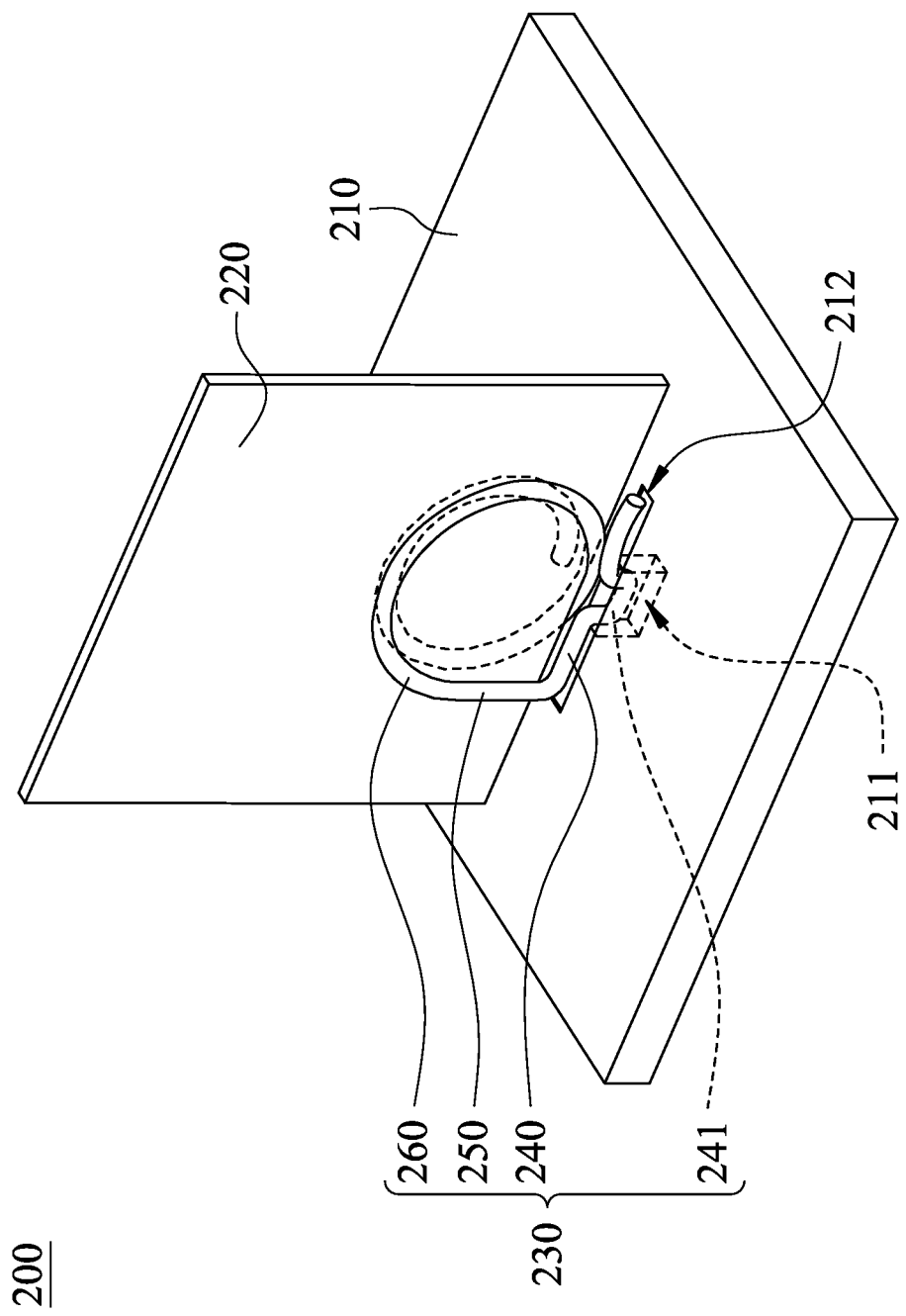
FIG. 4 is a schematic view of an air guiding device according to a second embodiment of the present disclosure.
Figure 5:
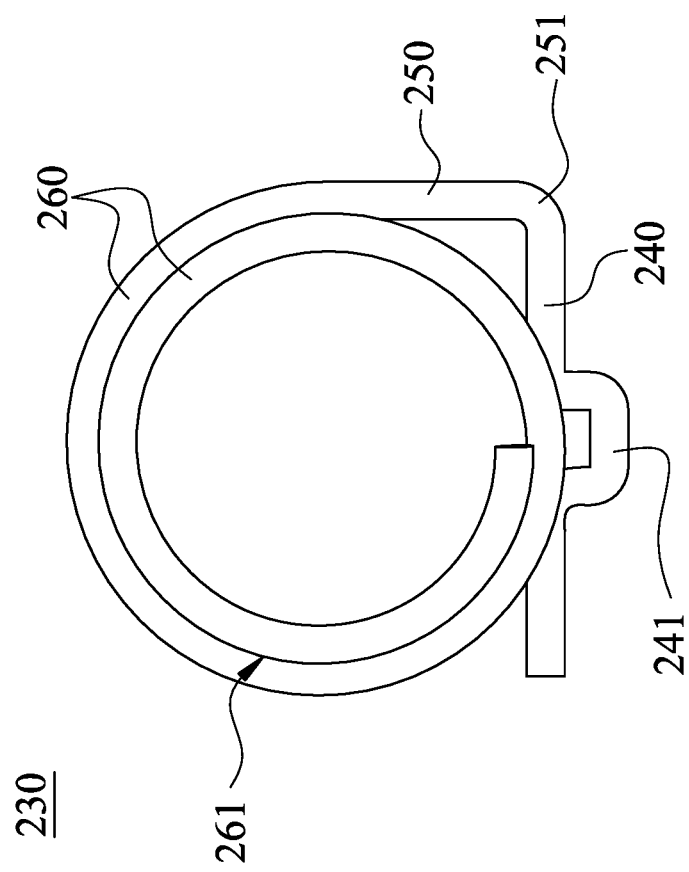
FIG. 5 is a schematic view of an air baffle fixing structure of the air guiding device according to the second embodiment of FIG. 4.

Please refer to FIG. 4 and FIG. 5. FIG. 4 is a schematic view of an air guiding device 200 according to a second embodiment of the present disclosure. FIG. 5 is a schematic view of an air baffle fixing structure 230 of the air guiding device 200 according to the second embodiment of FIG. 4. As shown in FIG. 4, the air guiding device 200 includes a board 210, an air baffle 220, and an air baffle fixing structure 230. As shown in FIG. 5, the air baffle fixing structure 230 includes a fixing part 240, a supporting part 250, and two ring parts 260. The two ring parts 260 have a clamping gap 261 therebetween. It is noted that the air guiding device 200 of the second embodiment is similar to the air guiding device 100 of the first embodiment, so the same parts will not be further described here.

In the second embodiment, the number of the fixing part 240 and the support part 250 is one, respectively. The supporting part 250 is connected to one of the ring parts 260. A bending angle 251 is between the fixing part 240 and the supporting part 250. The bending angle 251 makes the fixing part 240 and the supporting part 250 not on the same axis. Specifically, as shown in FIG. 4, the fixing part 240 forms a horizontal arm that is flush with the board 210. The supporting part 250 is connected to the fixing part 240 along a standing direction. Said standing direction is perpendicular to the fixing part 240 so that the supporting part 250 is erected from the board 210 in a direction away from the board 210.

Further, the fixing part 240 has a protrusion 241 that protrudes from the fixing part 240 in a direction away from the ring parts 260. The board 210 has a slot 211. The protrusion 241 is disposed in the slot 211. In addition, the board 210 may have a welding part 212, and a surface of the welding part 212 has a welding material (not labeled). The fixing part 240 is welded to the welding part 212. Specifically, as shown in FIG. 4, the raised protrusion 241 of the fixing part 240 can be inserted into the slot 211 of the board 210, and the portion of the fixing part 240 flush with the board 210 can be welded to the welding part 212 of the board 210. In this way, the stability of the connection between the air baffle fixing structure 230 and the board 210 can be effectively improved through two different connection methods of insertion and welding.

Third Embodiment

Figure 6:
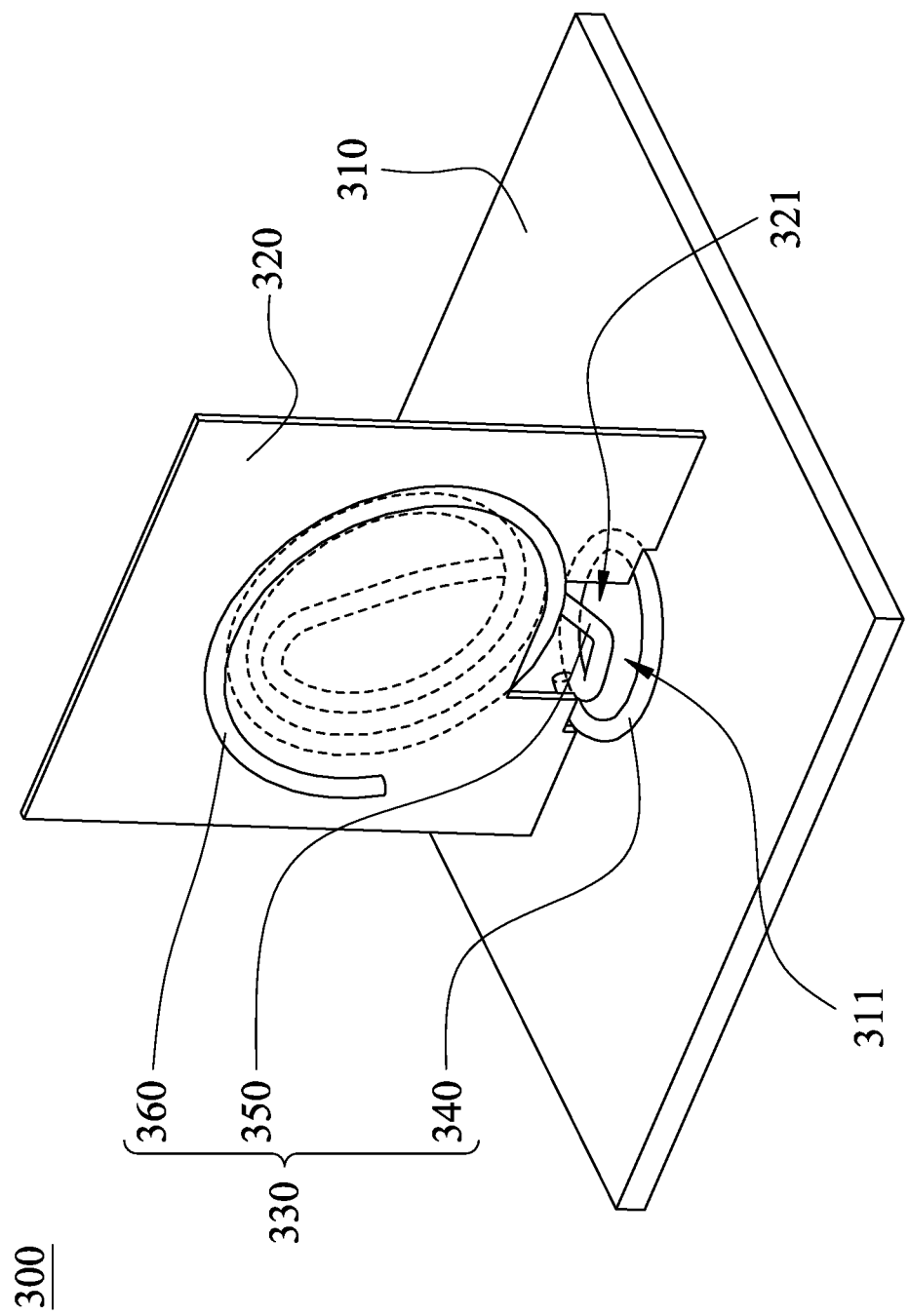
FIG. 6 is a schematic view of an air guiding device according to a third embodiment of the present disclosure.
Figure 7:
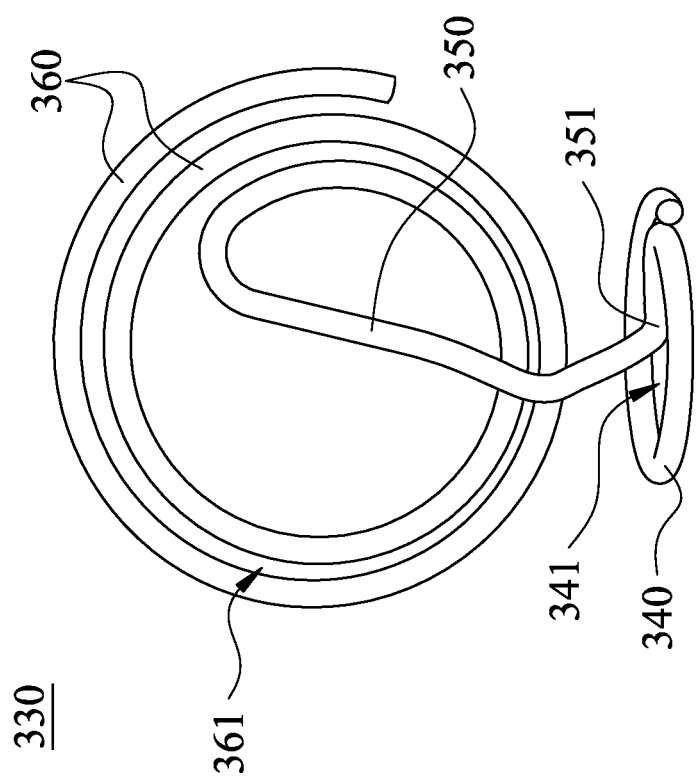
FIG. 7 is a schematic view of an air baffle fixing structure of the air guiding device according to the third embodiment of FIG. 6.

Please refer to FIG. 6 and FIG. 7. FIG. 6 is a schematic view of an air guiding device 300 according to a third embodiment of the present disclosure. FIG. 7 is a schematic view of an air baffle fixing structure 330 of the air guiding device 300 according to the third embodiment of FIG. 6. As shown in FIG. 6, the air guiding device 300 includes a board 310, an air baffle 320, and an air baffle fixing structure 330. As shown in FIG. 7, the air baffle fixing structure 330 includes a fixing part 340, a supporting part 350, and two ring parts 360. The two ring parts 360 have a clamping gap 361 therebetween. It is noted that the air guiding device 300 of the third embodiment is similar to the air guiding device 100 of the first embodiment, so the same parts will not be further described here.

In the third embodiment, the number of the fixing part 340 and the supporting part 350 is one, respectively. The supporting part 350 is connected to one of the ring parts 360. A bending angle 351 is between the fixing part 340 and the supporting part 350. The bending angle 351 makes the fixing part 340 and the supporting part 350 not on the same axis. Specifically, as shown in FIG. 6, the fixing part 340 is flush with the board 310. The supporting part 350 is connected to the fixing part 340 along a standing direction. The standing direction and the fixing part 340 are not parallel to each other so the supporting part 350 is erected from the board 310 in a direction away from the board 310.

Furthermore, as shown in FIG. 7, the fixing part 340 is bent and surrounds to form a connecting region 341. In the third embodiment, the fixing part 340 is bent to form a circular connecting region 341, but its shape is not limited thereto. The board 310 includes a welding part 311. A surface of the welding part 311 has a welding material (not labeled). The fixing part 340 is welded to the welding part 311. In this way, by setting the connecting region 341, the welding area between the fixing part 340 and the welding part 311 can be increased, thereby enhancing the stability of the connection between the air baffle fixing structure 330 and the board 310.

In addition, as shown in FIG. 6, in the third embodiment, the air baffle 320 has a groove 321 formed at one end of the air baffle 320 connected to the air baffle fixing structure 330. Specifically, when the air baffle 320 is clamped within the clamping gap 361, one of the ring parts 360 of the air baffle fixing structure 330 abuts against the groove 321 of the air baffle 320. In this way, the stability of the connection between the air baffle 320 and the air baffle fixing structure 330 can be improved.

Fourth Embodiment

Figure 8:
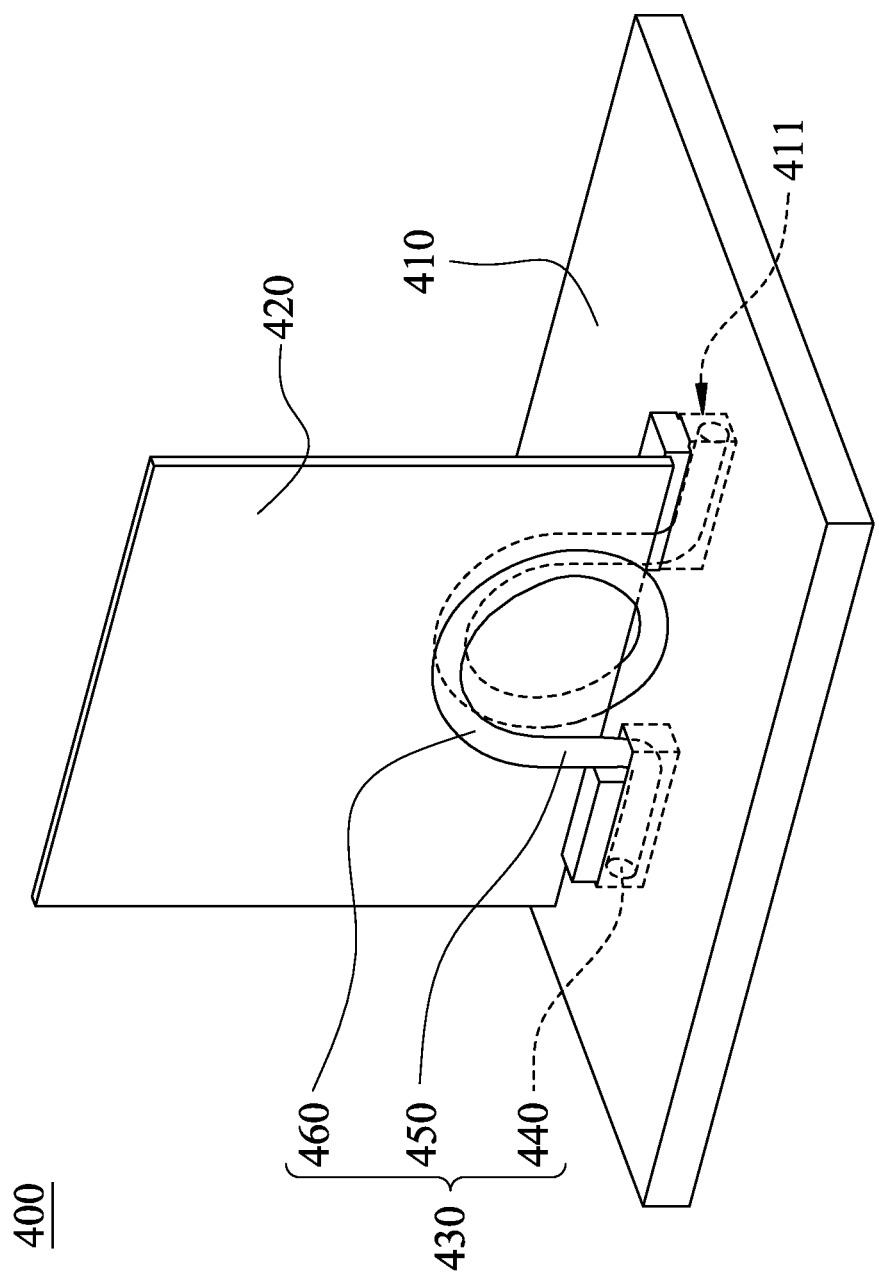
FIG. 8 is a schematic view of an air guiding device according to a fourth embodiment of the present disclosure.
Figure 9:
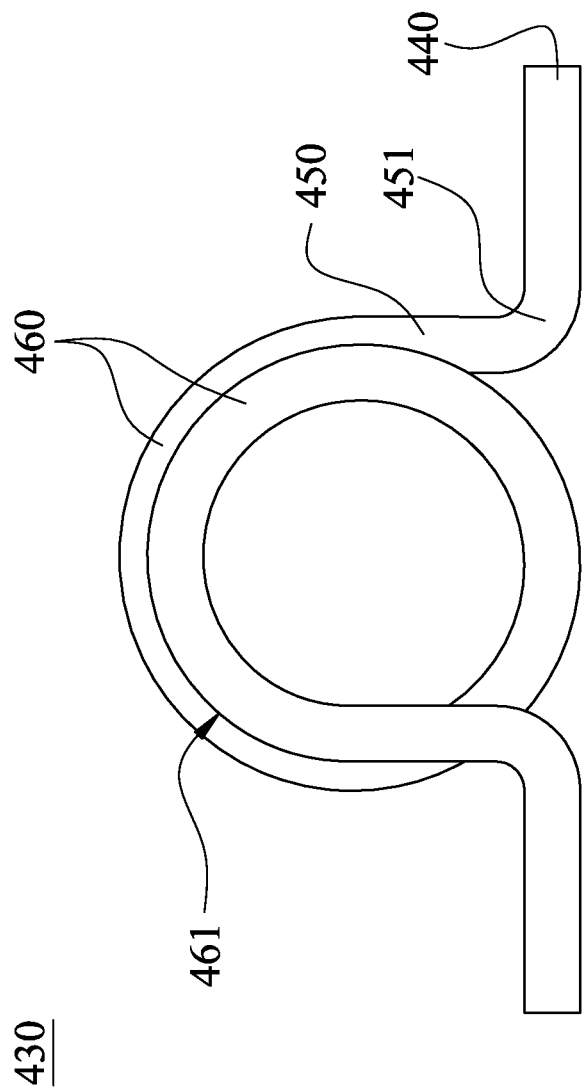
FIG. 9 is a schematic view of an air baffle fixing structure of the air guiding device according to the fourth embodiment of FIG. 8.

Please refer to FIG. 8 and FIG. 9. FIG. 8 is a schematic view of an air guiding device 400 according to a fourth embodiment of the present disclosure. FIG. 9 is a schematic view of an air baffle fixing structure 430 of the air guiding device 400 according to the fourth embodiment of FIG. 8. As shown in FIG. 8, the air guiding device 400 includes a board 410, an air baffle 420, and an air baffle fixing structure 430. As shown in FIG. 9, the air baffle fixing structure 430 includes a fixing part 440, a supporting part 450, and two ring parts 460. The two ring parts 460 have a clamping gap 461 therebetween. It is noted that the air guiding device 400 of the fourth embodiment is similar to the air guiding device 100 of the first embodiment, so the same parts will not be further described here.

In the fourth embodiment, the number of the fixing part 440 and the supporting part 450 is two, respectively. Each of the supporting parts 450 is connected between each of the fixing parts 440 and each of the ring parts 460. In this way, through the configuration of the fixing part 440 and the supporting part 450 as described above, the effect of the air baffle 420 supported by the air baffle fixing structure 430 can be more balanced.

In addition, a bending angle 451 is between the fixing part 440 and the supporting part 450. The bending angle 451 makes the fixing part 440 and the supporting part 450 not on the same axis. Specifically, as shown in FIG. 8, the fixing part 440 forms a horizontal arm that is flush with the board 410. Said two fixing parts 440 respectively extend out from two sides of the air baffle fixing structure 430. The supporting part 450 is connected to the fixing part 440 along a standing direction. Said standing direction is perpendicular to the fixing part 440 so that the supporting part 450 is erected from the board 410 in a direction away from the board 410.

Further, the board 410 has two fixing grooves 411 configured for providing the fixing part 440 of the air baffle fixing structure 430 to be disposed therein. Specifically, the board 410 is first processed to form a bridge, and the fixing part 440 of the air baffle fixing structure 430 is inserted into the bridge, and then the bridge is pressed and fixed, so that the fixing part 440 is wrapped and fixed in the fixing grooves 411. In this way, the stability of the connection between the air baffle fixing structure 430 and the board 410 can be effectively improved.

Fifth Embodiment

Figure 10:
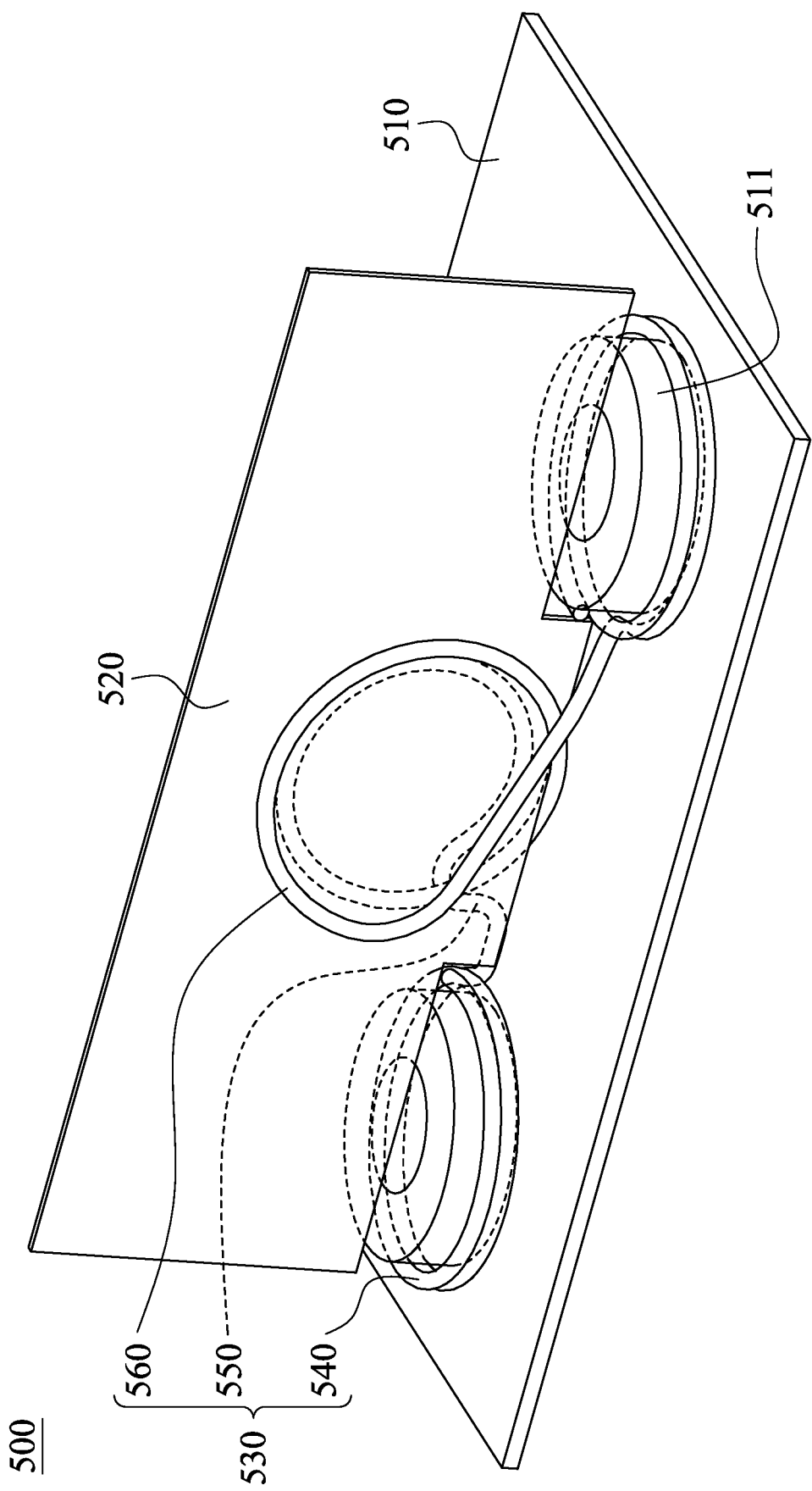
FIG. 10 is a schematic view of an air guiding device according to a fifth embodiment of the present disclosure.
Figure 11:
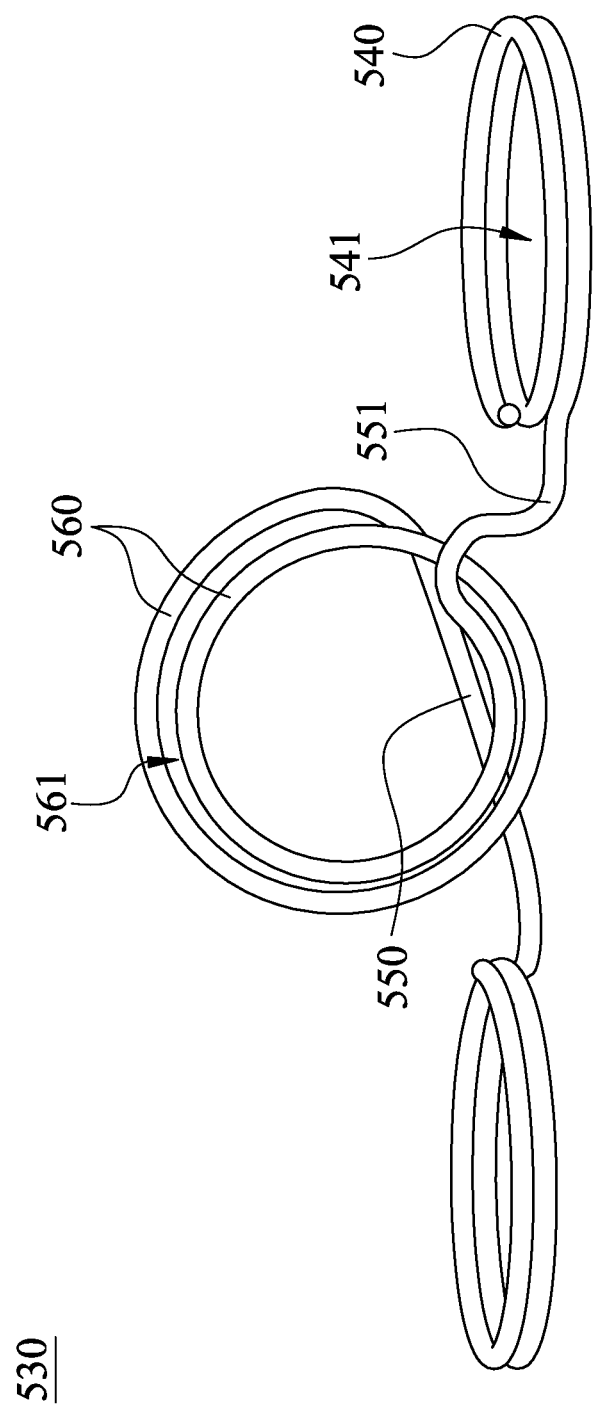
FIG. 11 is a schematic view of an air baffle fixing structure of the air guiding device according to the fifth embodiment of FIG. 10.

Please refer to FIG. 10 and FIG. 11. FIG. 10 is a schematic view of an air guiding device 500 according to a fifth embodiment of the present disclosure. FIG. 11 is a schematic view of an air baffle fixing structure 530 of the air guiding device 500 according to the fifth embodiment of FIG. 10. As shown in FIG. 10, the air guiding device 500 includes a board 510, an air baffle 520, and an air baffle fixing structure 530. As shown in FIG. 11, the air baffle fixing structure 530 includes a fixing part 540, a supporting part 550, and two ring parts 560. The two ring parts 560 have a clamping gap 561 therebetween. It is noted that the air guiding device 500 of the fifth embodiment is similar to the air guiding device 100 of the first embodiment, so the same parts will not be further described here.

In the fifth embodiment, the number of the fixing part 540 and the supporting part 550 is two, respectively. Each of the supporting parts 550 is connected between each of the fixing part 540 and each of the ring part 560. In this way, through the configuration of the fixing part 540 and the supporting parts 550 as described above, the effect of the air baffle 520 supported by the air baffle fixing structure 530 can be more balanced.

In addition, a bending angle 551 is between the fixing part 540 and the supporting part 550. The bending angle 551 makes the fixing part 540 and the supporting part 550 not on the same axis. Specifically, as shown in FIG. 10, the fixing part 540 is flush with the board 510. The supporting part 550 is connected to the fixing part 540 along a standing direction. The standing direction and the fixing part 540 are not parallel to each other so the supporting part 550 is erected from the board 510 in a direction away from the board 510.

Furthermore, the two fixing parts 540 are respectively bent and surround to form connecting regions 541 on both sides of the air baffle fixing structure 530. In the fifth embodiment, the fixing parts 540 are bent to form circular connecting regions 541, but their shapes are not limited thereto. The board 510 includes at least one drawing part 511. In the fifth embodiment, the number of the drawing parts 511 is two, and their positions correspond to the two fixing parts 540. The drawing parts 511 protrude from a surface of the board 510, and the connecting regions 541 of the fixing parts 540 of the air baffle fixing structure 530 can be fitted on and around the drawing parts 511 of the board 510. Specifically, the board 510 is first drawn to form the drawing parts 511, and then the connecting regions 541 of the fixing parts 540 are fitted on the drawing parts 511 and pressed to be fixed. In this way, not only the support effect of the supporting parts 550 is more balanced but also the connection area between the air baffle fixing structure 530 and the board 510 is increased, thereby effectively improving the stability of the connection between the air baffle fixing structure 530 and the board 510.

Sixth Embodiment

Figure 12:
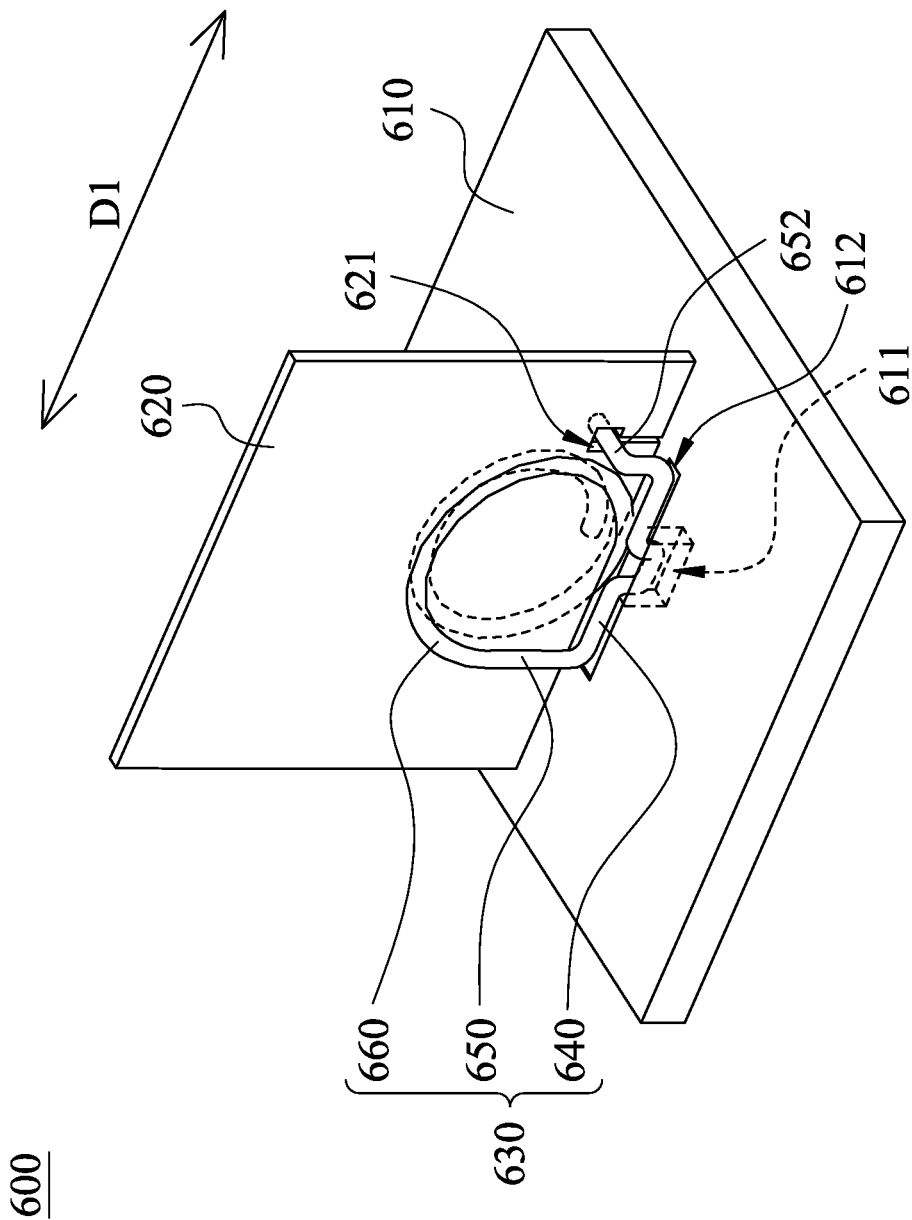
FIG. 12 is a schematic view of an air guiding device according to a sixth embodiment of the present disclosure.
Figure 13:
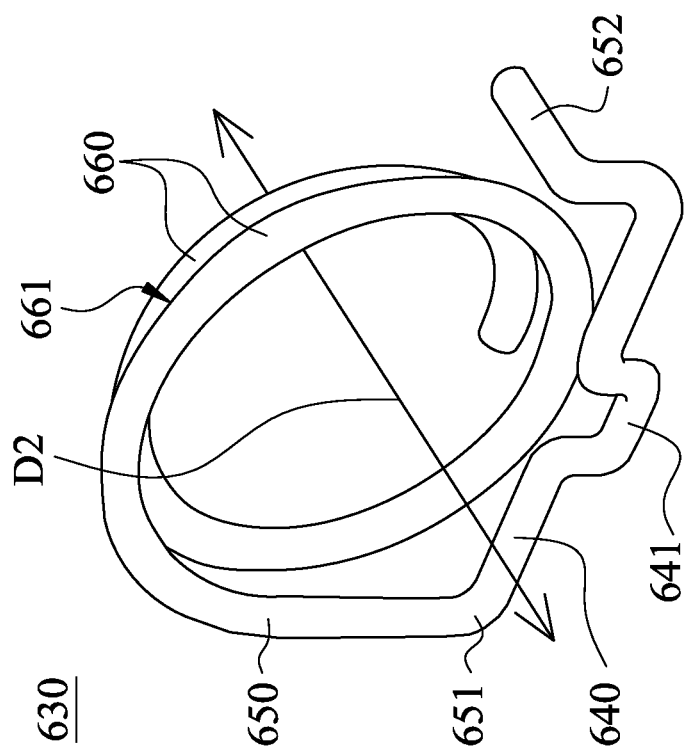
FIG. 13 is a schematic view of an air baffle fixing structure of the air guiding device according to the sixth embodiment of FIG. 12.
Figure 14:
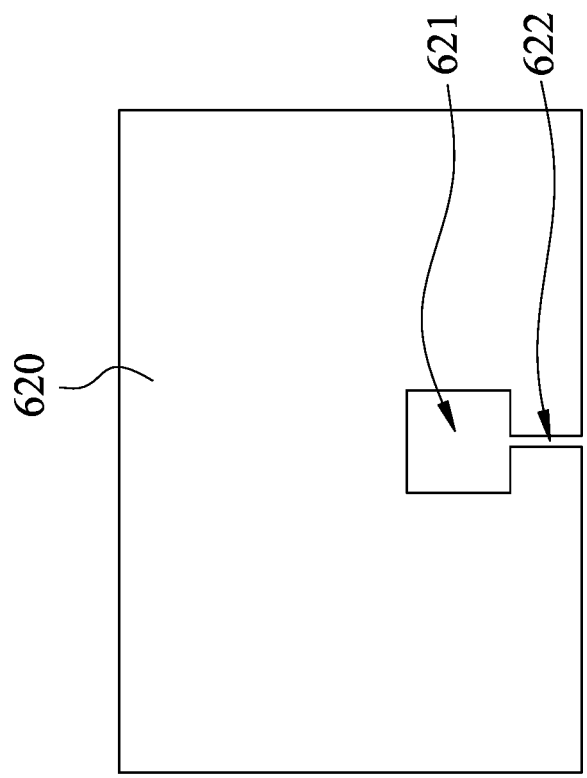
FIG. 14 is a schematic view of an air baffle of the air guiding device according to the sixth embodiment of FIG. 12.

Please refer to FIG. 12, FIG. 13 and FIG. 14. FIG. 12 is a schematic view of an air guiding device 600 according to a sixth embodiment of the present disclosure. FIG. 13 is a schematic view of an air baffle fixing structure 630 of the air guiding device 600 according to the sixth embodiment of FIG. 12. FIG. 14 is a schematic view of an air baffle 620 of the air guiding device 600 according to the sixth embodiment of FIG. 12.

As shown in FIG. 12, the air guiding device 600 includes a board 610, an air baffle 620, and an air baffle fixing structure 630. As shown in FIG. 13, the air baffle fixing structure 630 includes a fixing part 640, a supporting part 650, and two ring parts 660. The two ring parts 660 have a clamping gap 661 therebetween. A bending angle 651 is between the fixing part 640 and the supporting part 650. In addition, a protrusion 641 of the fixing part 640 is disposed in the slot 611 of the board 610. The fixing part 640 can be welded to a welding part 612 of the board 610. Specifically, the air guiding device 600 of the sixth embodiment is similar to the air guiding device 200 of the second embodiment, so the same parts will not be further described here.

Particularly, in the sixth embodiment, the fixing part 640 further has a positioning part 652, and the positioning part 652 protrudes from the fixing part 640 along the clamping direction D2. As shown in FIG. 12, the air baffle 620 has a positioning hole 621, and the positioning part 652 is inserted through the positioning hole 621. Specifically, as shown in FIG. 12 and FIG. 13, the air baffle 620 is clamped and fixed in the clamping gap 661 of the air baffle fixing structure 630 along the air direction D1. The positioning part 652 of the air baffle fixing structure 630 is inserted through the positioning hole 621 of the air baffle 620 along the clamping direction D2, in which the air direction D1 is perpendicular to the clamping direction D2. In this way, through the clamping of the clamping gap 661 and the penetration of the positioning part 652, the air baffle fixing structure 630 can limit the air baffle 620 in two different directions. In this way, the effectiveness of fixing the air baffle 620 by the air baffle fixing structure 630 can be further improved, and the stability of the air baffle 620 in different directions can be enhanced, making it less susceptible to displacement and shaking caused by the blowing of heat dissipation air.

In addition, as shown in FIG. 14, the air baffle 620 can further have a guiding part 622, and the guiding part 622 is adjacent to the positioning hole 621. The positioning part 652 is vertically inserted into the air baffle 620 by the guiding part 622, so that the limiting hole 621 abuts against the positioning part 652 of the air baffle fixing structure 630, thereby increasing the stability of the air baffle 620 in a direction perpendicular to the board 610. The disposal of the guiding part 622 can assist in positioning the positioning part 652, so that the assembly of the air baffle 620 and the air baffle fixing structure 630 can be smoother.

Seventh Embodiment

Figure 15:
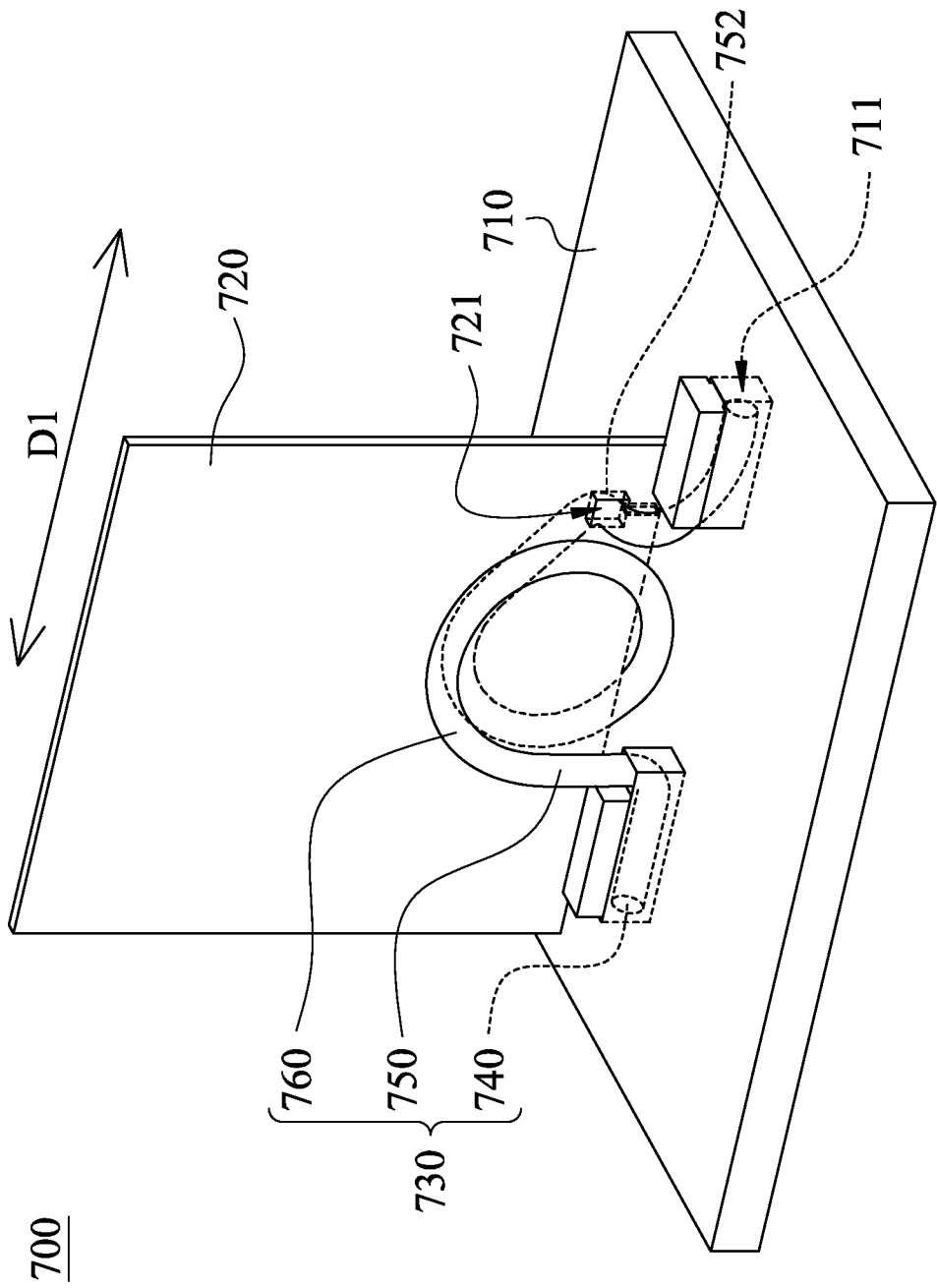
FIG. 15 is a schematic view of an air guiding device according to a seventh embodiment of the present disclosure.
Figure 16:
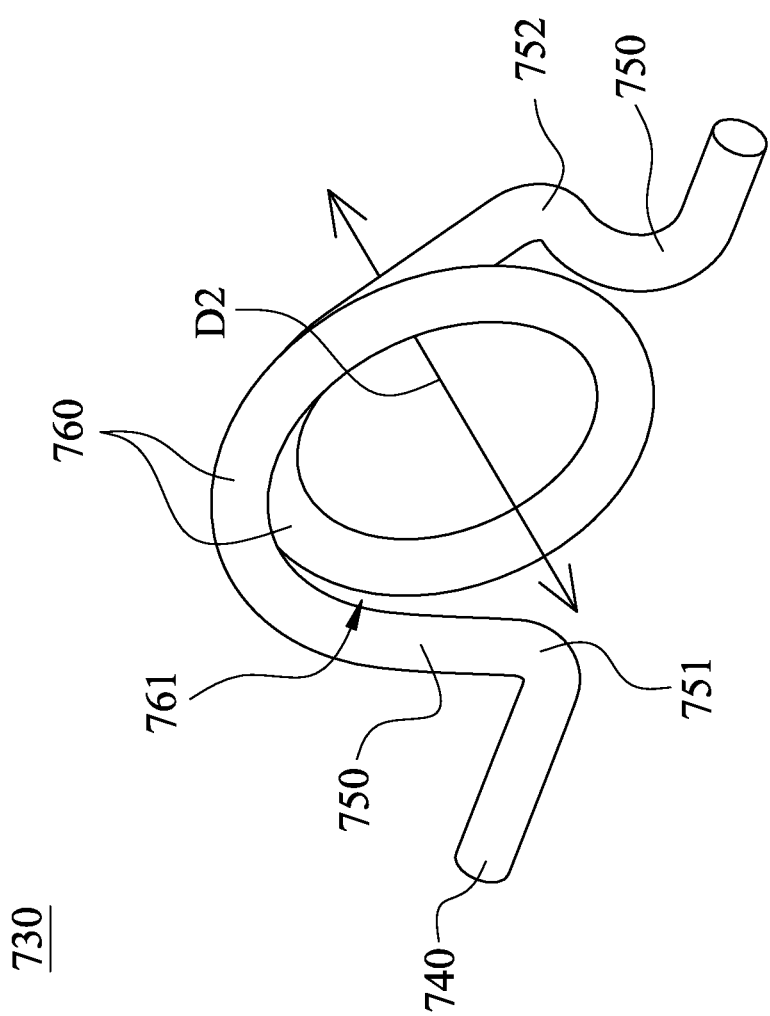
FIG. 16 is a schematic view of an air baffle fixing structure of the air guiding device according to the seventh embodiment of FIG. 15.

Please refer to FIG. 15 and FIG. 16. FIG. 15 is a schematic view of an air guiding device 700 according to a seventh embodiment of the present disclosure. FIG. 16 is a schematic view of an air baffle fixing structure 730 of the air guiding device 700 according to the seventh embodiment of FIG. 15. As shown in FIG. 15, the air guiding device 700 includes a board 710, an air baffle 720, and an air baffle fixing structure 730. As shown in FIG. 16, the air baffle fixing structure 730 includes a fixing part 740, a supporting part 750, and two ring parts 760. The two ring parts 760 have a clamping gap 761 therebetween. A bending angle 751 is between the fixing part 740 and the supporting part 750. The fixing part 740 of the air baffle fixing structure 730 is disposed in the fixing groove 711 of the board 710. Specifically, the air guiding device 700 of the seventh embodiment is similar to the air guiding device 400 of the fourth embodiment, so the same parts will not be further described here.

Particularly, in the seventh embodiment, the supporting part 750 further has a positioning part 752, and the positioning part 752 protrudes from the supporting part 750 along the clamping direction D2. As shown in FIG. 15, the air baffle 720 has a positioning hole 721, and the positioning part 752 is inserted through the positioning hole 721. In the seventh embodiment, the number of the positioning part 752 is one, and the positioning part 752 is disposed in one of the supporting parts 750, but is not limited to the disclosure. In other embodiments, the number of the positioning part can be configured as two, and they can be respectively disposed on two supporting parts.

Specifically, as shown in FIG. 15 and FIG. 16, the air baffle 720 is clamped and fixed in the clamping gap 761 of the air baffle fixing structure 730 along the air direction D1. The positioning part 752 of the air baffle fixing structure 730 is inserted through the positioning hole 721 of the air baffle 720 along the clamping direction D2, in which the air direction D1 is perpendicular to the clamping direction D2. In this way, through the clamping of the clamping gap 761 and the penetration of the positioning part 752, the air baffle fixing structure 730 can limit the air baffle 720 in two different directions. In this way, the effectiveness of fixing the air baffle 720 by the air baffle fixing structure 730 can be further improved, and the stability of the air baffle 720 in different directions can be enhanced, making it less susceptible to displacement and shaking caused by the blowing of heat dissipation air.

In addition, the structure of the air baffle 720 can be the same as the structure of the air baffle 620 in the sixth embodiment as shown in FIG. 14. Furthermore, the air baffle 720 can further have a guiding part (not labeled) to increase the stability of the air baffle 720 in a direction perpendicular to the board 710.

Eighth Embodiment

Figure 17:
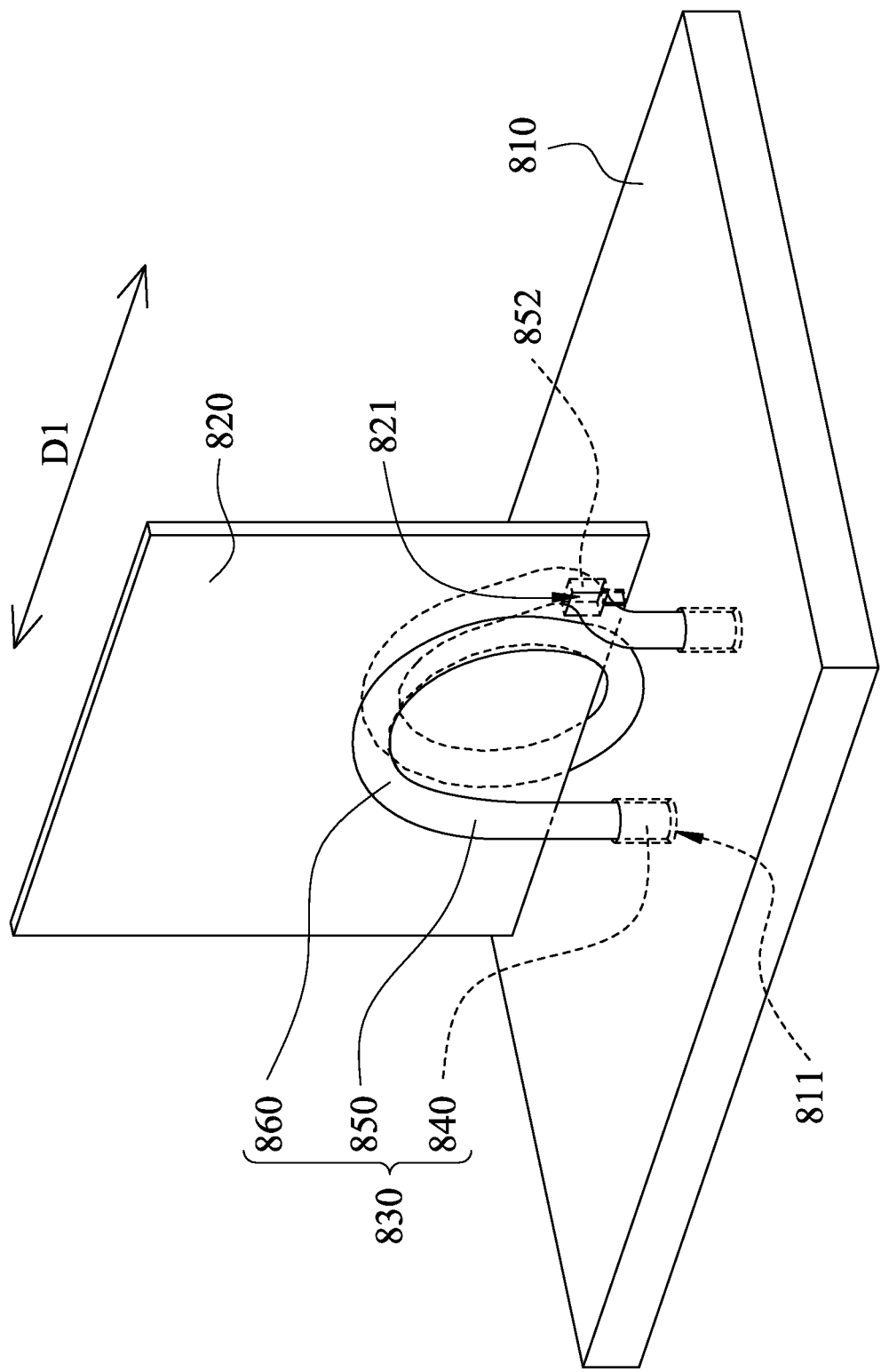
FIG. 17 is a schematic view of an air guiding device according to an eighth embodiment of the present disclosure.
Figure 18:
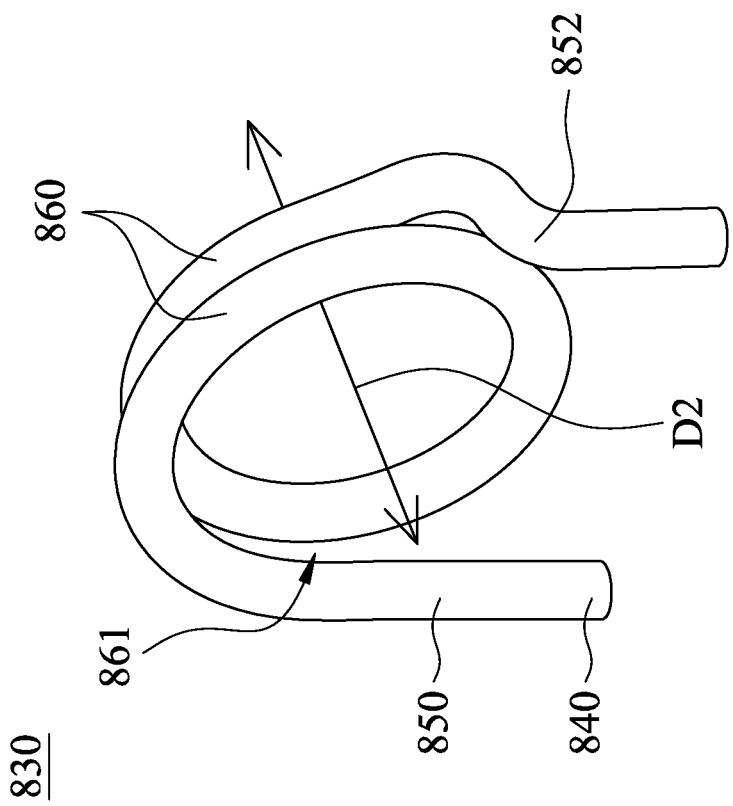
FIG. 18 is a schematic view of an air baffle fixing structure of the air guiding device according to the eighth embodiment of FIG. 17.

Please refer to FIG. 17 and FIG. 18. FIG. 17 is a schematic view of an air guiding device 800 according to an eighth embodiment of the present disclosure. FIG. 18 is a schematic view of an air baffle fixing structure 830 of the air guiding device 800 according to the eighth embodiment of FIG. 17. As shown in FIG. 17, the air guiding device 800 includes a board 810, an air baffle 820, and an air baffle fixing structure 830. As shown in FIG. 18, the air baffle fixing structure 830 includes a fixing part 840, a supporting part 850, and two ring parts 860. The two ring parts 860 have a clamping gap 861 therebetween. The fixing part 840 of the air baffle fixing structure 830 is inserted through an fixing hole 811 of the board 810. Specifically, the air guiding device 800 of the eighth embodiment is similar to the air guiding device 100 of the first embodiment, so the same parts will not be further described here.

Particularly, in the eighth embodiment, the supporting part 850 further has a positioning part 852, and the positioning part 852 protrudes from the supporting part 850 along the clamping direction D2. As shown in FIG. 17, the air baffle 820 has a positioning hole 821, and the positioning part 852 is inserted through the positioning hole 821. In the eighth embodiment, the number of the positioning part 852 is one, and the positioning part 852 is disposed in one of the supporting parts 850, but is not limited to the disclosure. In other embodiments, the number of the positioning part can be configured as two, and they can be respectively disposed on two supporting parts.

Specifically, as shown in FIG. 17 and FIG. 18, the air baffle 820 is clamped and fixed in the clamping gap 861 of the air baffle fixing structure 830 along the air direction D1. The positioning part 852 of the air baffle fixing structure 830 is inserted through the positioning hole 821 of the air baffle 820 along the clamping direction D2, in which the air direction D1 is perpendicular to the clamping direction D2. In this way, through the clamping of the clamping gap 861 and the penetration of the positioning part 852, the air baffle fixing structure 830 can limit the air baffle 820 in two different directions. In this way, the effectiveness of fixing the air baffle 820 by the air baffle fixing structure 830 can be further improved, and the stability of the air baffle 820 in different directions can be enhanced, making it less susceptible to displacement and shaking caused by the blowing of heat dissipation air.

In addition, the structure of the air baffle 820 can be the same as the structure of the air baffle 620 in the sixth embodiment as shown in FIG. 14. Furthermore, the air baffle 820 can further have a guiding part (not labeled) to increase the stability of the air baffle 820 in a direction perpendicular to the board 810.

BENEFICIAL EFFECTS OF THE EMBODIMENTS

In summary, the air baffle fixing structure of the present disclosure utilizes a metal wire bent into a ring part to create a clamping gap between the ring parts for clamping the air baffle. In this way, the cost of assembling the air baffle can be reduced, and the space for wiring can be increased. In addition, by special configurations of the air baffle fixing structures, the air guiding device of the present disclosure can be put into automatic production, thereby improving production efficiency and product competitiveness.

The foregoing description of the disclosure has been presented only for the purposes of illustration and description option of the exemplary embodiments and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An air baffle fixing structure configured to be disposed on a board and for fixing an air baffle, comprising:
   at least one fixing part for connecting to the board;
   at least one supporting part connected to the at least one fixing part along a standing direction; and
   at least two ring parts, the at least one supporting part connected to at least one of the at least two ring parts, wherein two of the at least two ring parts overlap in a clamping direction, a clamping gap is formed between the two ring parts for fixing the air baffle along an air direction, and the air direction is perpendicular to the clamping direction;
   wherein the at least one fixing part, the at least one supporting part, and the at least two ring parts are integrally formed by bending a metal wire.

2. The air baffle fixing structure according to claim 1, wherein a bending angle is formed between the at least one fixing part and the at least one supporting part, such that the at least one fixing part and the at least one supporting part are not on a same axis.

3. The air baffle fixing structure according to claim 2, wherein the at least one fixing part has a protrusion protruding from the at least one fixing part in a direction away from the at least two ring parts.

4. The air baffle fixing structure according to claim 2, wherein the at least one fixing part is bent and surrounds to form a connecting region.

5. The air baffle fixing structure according to claim 1, wherein the at least one supporting part has a positioning part protruding from the at least one supporting part along the clamping direction.

6. The air baffle fixing structure according to claim 1, wherein a diameter of the metal wire ranges from 0.5 mm to 2.0 mm.

7. The air baffle fixing structure according to claim 1, wherein a number of the at least one supporting part is two, a number of the at least one fixing part is two, and each of the supporting parts is connected between each of the fixing parts and each of the ring parts.

8. The air baffle fixing structure according to claim 1, wherein a number of the at least one supporting part is one, a number of the at least one fixing part is one, and the supporting part is connected to one of the at least two ring parts.

9. An air guiding device comprising:
   a board;
   an air baffle; and
   an air baffle fixing structure, wherein one end of the air baffle fixing structure is connected to the board, an another end of the air baffle fixing structure is connected to the air baffle, the air baffle fixing structure is configured to fix the air baffle on the board, and the air baffle fixing structure comprises:
   at least one fixing part connected to the board;
   at least one supporting part connected to the at least one fixing part, and the at least one supporting part erected from the board in a direction away from the board; and
   at least two ring parts, the at least one supporting part connected to at least one of the at least two ring parts, wherein two of the at least two ring parts overlap in a clamping direction, a clamping gap is formed between the two ring parts, the air baffle is fixed in the clamping gap along an air direction, and the air direction is perpendicular to the clamping direction;
   wherein the at least one fixing part, the at least one supporting part, and the at least two ring parts are integrally formed by bending a metal wire.

10. The air guiding device according to claim 9, wherein a bending angle is formed between the at least one fixing part and the at least one supporting part, such that the at least one fixing part and the at least one supporting part are not on a same axis.

11. The air guiding device according to claim 10, wherein the at least one fixing part has a protrusion protruding from the at least one fixing part in a direction away from the at least two ring parts, the board has a slot, and the protrusion is disposed in the slot.

12. The air guiding device according to claim 10, wherein the at least one fixing part is bent and surrounds to form a connecting region.

13. The air guiding device according to claim 12, wherein the board comprises at least one drawing part protruded from a surface of the board, and the connecting region of the at least one fixing part of the air baffle fixing structure is fitted on the at least one drawing part of the board.

14. The air guiding device according to claim 9, wherein the board comprises at least one fixing hole, and the at least one fixing part of the air baffle fixing structure is inserted through the at least one fixing hole of the board.

15. The air guiding device according to claim 9, wherein the board comprises a welding part, a surface of the welding part has a welding material, and the at least one fixing part is welded to the welding part.

16. The air guiding device according to claim 9, wherein the at least one supporting part has a positioning part protruding from the supporting part along the clamping direction, the air baffle has a positioning hole, and the positioning part is inserted through the positioning hole.

17. The air guiding device according to claim 9, wherein the at least one fixing part has a positioning part protruding from the fixing part along the clamping direction, the air baffle has a positioning hole, and the positioning part is inserted through the positioning hole.

18. The air guiding device according to claim 9, wherein a diameter of the metal wire ranges from 0.5 mm to 2.0 mm.

19. The air guiding device according to claim 9, wherein a width of the clamping gap is narrower than a thickness of the air baffle in the clamping direction, the air baffle is made of plastic sheet material with a thickness ranging from 0.25 mm to 2.0 mm, or the air baffle is made of sheet metal material with a thickness ranging from 0.15 mm to 0.4 mm.

20. The air guiding device according to claim 9, wherein the air baffle has a clamping height and a total height, and a ratio of the clamping height to the total height is between 0.25:1 to 1:1.

* * * * *